United States Patent [19]
Johnson

[11] 3,780,556
[45] Dec. 25, 1973

[54] TUBE CORRUGATING APPARATUS AND METHOD

[75] Inventor: Ernest H. Johnson, Chicago, Ill.

[73] Assignee: Andrew Corporation, Orland Park, Ill.

[22] Filed: Sept. 27, 1971

[21] Appl. No.: 183,857

[52] U.S. Cl............................ 72/78, 72/126, 72/191
[51] Int. Cl.............................................. B21d 15/06
[58] Field of Search ................. 72/77, 78, 190, 191, 72/194, 95, 96, 100, 112, 126

[56] References Cited
UNITED STATES PATENTS

| | | | |
|---|---|---|---|
| 2,614,607 | 10/1952 | Klein | 72/194 |
| 2,757,706 | 8/1956 | Johnston | 72/96 |
| 3,672,196 | 6/1972 | Levacher et al. | 72/77 |
| 436,463 | 9/1890 | Richard | 72/78 |
| 3,323,339 | 6/1967 | Mattil | 72/78 |
| 3,387,477 | 6/1968 | Shupper | 72/77 |

*Primary Examiner*—Lowell A. Larson
*Attorney*—C. Frederick Leydig et al.

[57] ABSTRACT

To form an annularly corrugated tube, an uncorrugated tube is driven in the direction of its longitudinal axis while a toothed corrugating tool mounted for free rotation on a transverse axis is circularly orbited about the tube with successive teeth of the corrugating tool pressing into the surface of the tube to form spaced annular grooves. As the tube moves forwardly each successive groove engages and advances the tooth of the corrugating tool which is employed in its formation, thus commencing the formation of a succeeding groove by a succeeding tooth.

7 Claims, 8 Drawing Figures

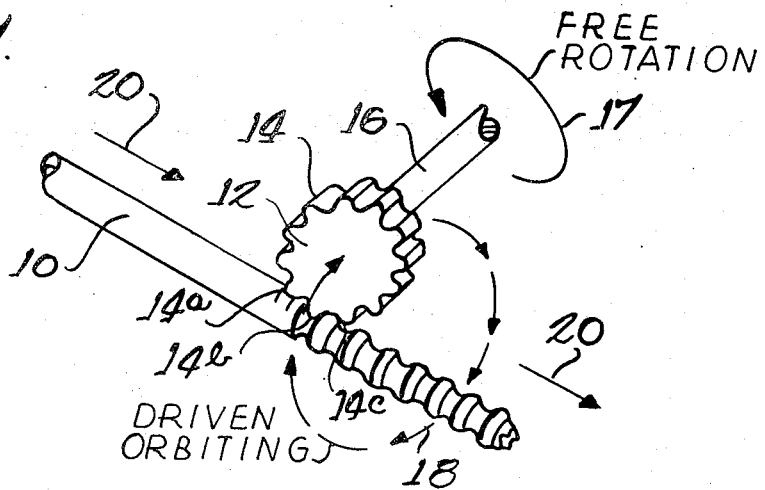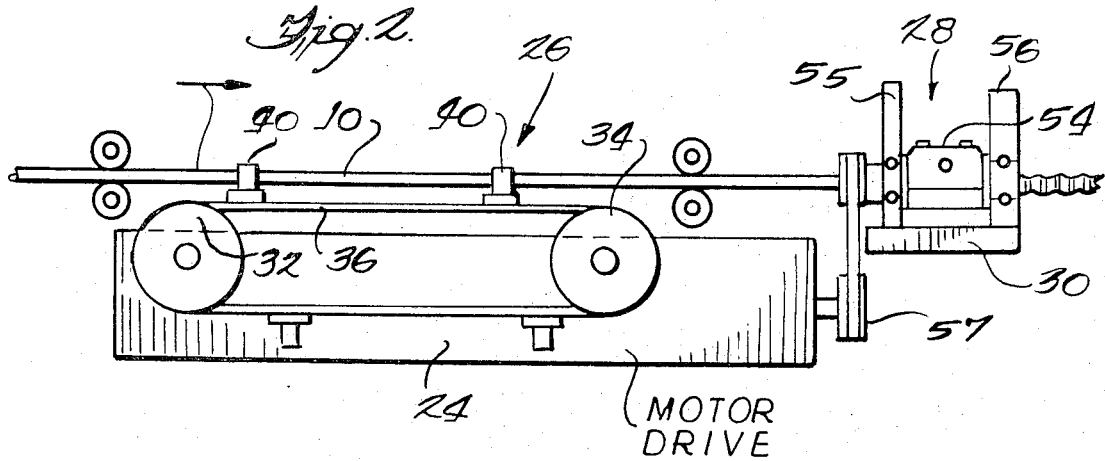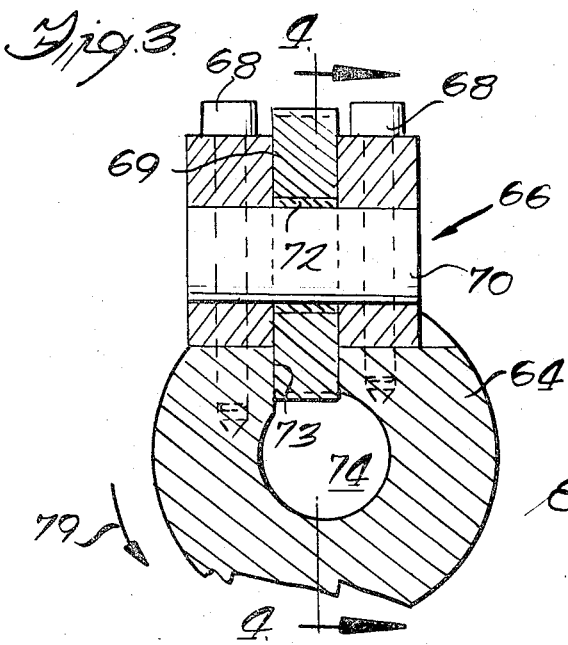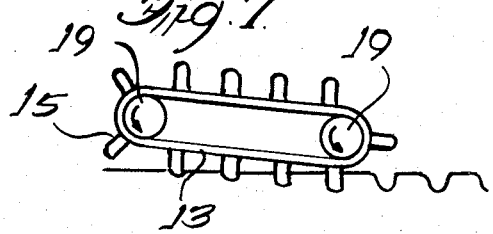

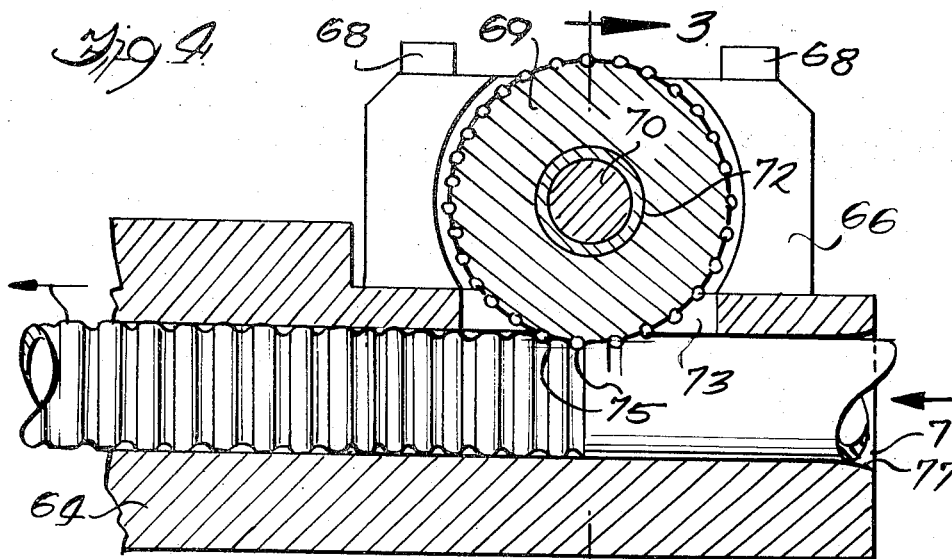
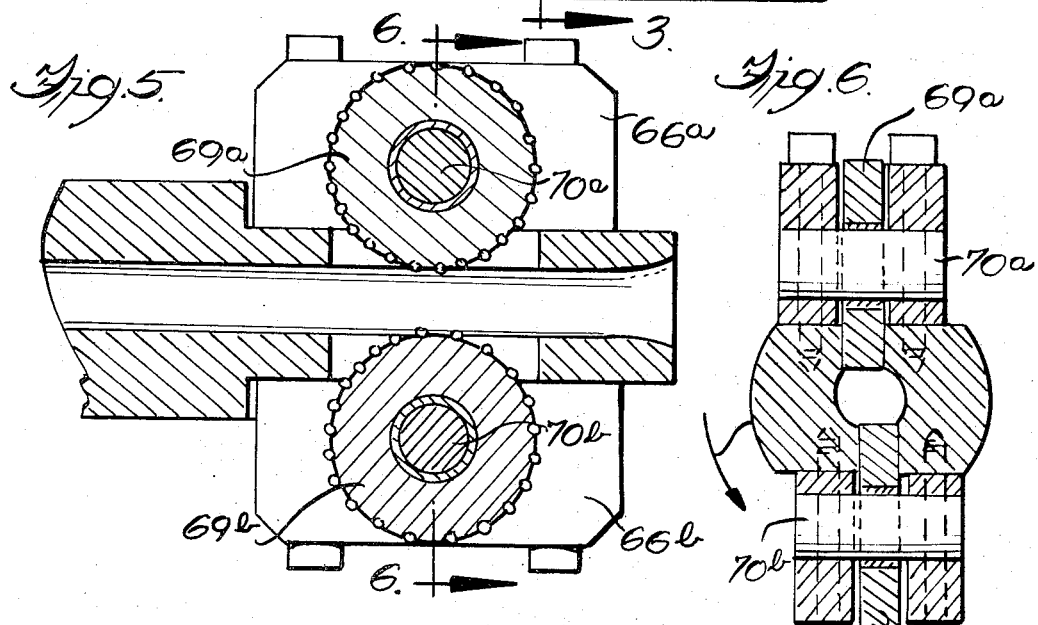
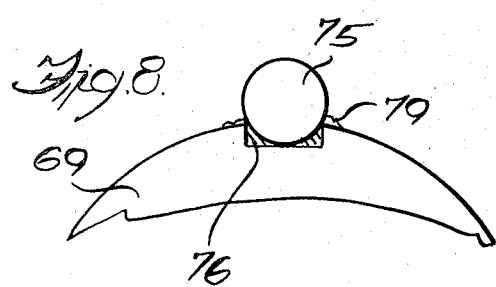

TUBE CORRUGATING APPARATUS AND METHOD

This invention relates to methods and apparatus for corrugating tubes and more particularly for forming corrugations in the continuous production of tubing of the type used in high-frequency cable, waveguide and the like.

A number of methods and types of apparatus have been devised to produce corrugations in metallic (including metal-like) tubes. Because of relative simplicity and reliability of heretofore-known fabrication machinery helical corrugations have long been in much more widespread use than annular corrugations particularly in commercial products wherein tubing is corrugated in long lengths, such as in the continuous-process manufacture of cable and waveguide. In such manufacture a helical corrugation is commonly formed on a tube by continuous motion of a corrugating tool around the tube at a rate synchronized with a drive which produces the tube's continuous forward motion. Such a corrugation operation involves no complications of intermittent or reciprocatory motions, etc., in the machinery, as are involved in comparably evident manners of producing annular corrugations. Various attempts have been made in the prior art to devise annular corrugation methods and apparatus avoiding intermittent tube motion and reciprocatory motions of tools and the like, but none have heretofore been sufficiently satisfactory to achieve widespread use comparable with the use of helical corrugation, despite theoretical and practical advantages of annular corrugations for many or most uses.

Even with the apparent simplicity of a helical corrugating operation, considerable difficulty may be encountered in producing wholly smooth and uniform corrugations. Smoothness and uniformity of corrugation formation is found particularly critical in the case of tubing for high-frequency radiation transmission such as coaxial cable and waveguide, where corrugation imperfections and pitch variations too small to be readily observed have been found to produce highly undesirable reflections or standing-waves. To compound the problem, where the tubing is of the small thickness employed for such purposes, similar considerations of ultimate electrical performance limit the tightness of grasping of the tube by the conveyor mechanism which feeds the tube to the corrugator, so that even the most exact synchronism of the conveyor drive mechanism with the corrugating drive mechanism does not guarantee the desired uniformity of corrugations because any slippage between the tube and the conveyor distorts the corrugation configuration. Further constructions of substantial complexity are accordingly added to helical corrugating machines for high-frequency tubing products to correct or compensate for gradual or instantaneous loss of synchronism between tube speed and corrugating-tool speed in production of such tubing, but it is found that such correction or compensation is often inexact. Annular corrugating machines suitable for continuous production of high-frequency tubing products known prior to the present invention are even less satisfactory as regards both simplicity of the machinery and problems relating to maintenance of synchronization between the advancing tube and the corrugator.

It is accordingly the main or principal object of this invention to provide a method and apparatus for annular corrugation of tubing which are fully practical for commercial use, particularly in the manufacture of cable, waveguide, and similar products, and more specifically to provide a method and apparatus for such corrugation which are highly simple and reliable, and it is a further object to solve the difficulties associated with maintaining exactness of synchronism between the operation of the corrugating tool and the motion of the tube which have been encountered in such manufacture with helical corrugation and with annular corrugation methods and apparatus heretofore known. The invention not only provides a method and apparatus for annular corrugation of such tubing which are as simple and practical as those heretofore employed for helical corrugation but in addition produces great simplification, while at the same time eliminating a major source of objectionable corrugation irregularity and non-uniformity which has been found in present processes of manufacture of helically corrugated tubing, particularly for high-frequency electrical use.

In the present invention, as in a number of prior art annular corrugation devices, the tube is continuously advanced in the direction of its longitudinal axis and each successive spaced groove is formed by applying radial deforming pressure of an orbiting corrugating tool while simultaneously advancing the point of contact of the tool synchronously with the advancing of the tube. However in the present invention, rather than having each groove initiated at a point internally determined by the machinery, each groove is initiated at a longitudinal point on the tube which is substantially entirely determined by the position of at least one predecessor groove. Thus the spacing of the corrugations is essentially independent of the tube speed, and variations in corrugation spacing are not produced by slippage of the tube or other loss of synchronism of the tube motion and corrugator operation.

As a further aspect of the invention, the machinery is greatly simplified without sacrifice of quality of the corrugation. Successive grooves are formed with successive discrete grooving portions of the corrugating tool, each grooving portion being moved forwardly and inwardly against the tube to commence its groove substantially solely in response to the reaching of a point in the forward motion of at least one predecessor grooving portion produced by the forward motion of the tube and being thereafter moved forward by the tube to initiate the inward and forward motion of a successor grooving portion. The motion of the tube itself thus produces the motion of the working portion of the corrugating tool, eliminating the necessity of mechanism for this purpose. By coupling together a series of grooving portions on a recirculating tool member, most desirably a wheel, the tool is continuously recycled by the motion of the tube itself, and all mechanism for powering the forward and inward motion of the tube may be eliminated.

In the simplest form of construction, the corrugating tool employed in the invention is a simple wheel with extending teeth or working segments disposed about its periphery, the wheel being journalled on a transverse axis at the side of the tube and being orbited about the tube as it is rotated about its center by the motion of the tube. To provide a backing or support for the tube as it is being worked on, there is desirably orbited with the tool a suitable backing member diametrically opposed to the tool, thus providing a deeper resulting corrugation than where the tube is free to be deflected away from the orbiting tool. In another form of the invention, having certain advantages later described, the desired backing or support action is provided by the mutual interaction of two similar tools oppositely disposed across the diameter of the tube. As another aspect of the invention, the orbiting assembly has circular-arc guide segments closely surrounding the advancing tube and longitudinally extending through the corrugating region at each side of the path of motion of the grooving members. With a single set of grooving members these guide segments form a continuous arc with the backing portion. Where a plurality of sets of grooving members are employed, the sets are substantially spaced around the tube, with the guide segments interposed between them. In further accordance with the invention the grooving members are offset or laterally displaced rather than being centered on the tube, thus increasing the available space for the guide segments.

In addition to the general features of the method and apparatus of the invention just described, and the advantages thereby obtained, the invention provides a number of further novel features of both method and apparatus for annular corrugation, and advantages thereby obtained, which will be better understood by reference to the embodiments of the invention in the attached drawing, in which:

FIG. 1 is a diagrammatic perspective view of a corrugating head employed in the method of the invention;

FIG. 2 is a diagrammatic view of a tube-corrugating machine incorporating a head of the general type schematically shown in FIG. 1;

FIG. 3 is a transverse sectional view of a corrugating tool assembly or head constituting a portion of the machine of FIG. 2;

FIG. 4 is a fragmentary longitudinal sectional view along the line 4—4 of FIG. 3;

FIG. 5 is a fragmentary longitudinal sectional view of a variant corrugating tool assembly;

FIG. 6 is a transverse sectional view along the line 6—6 of FIG. 5;

FIG. 7 is a diagrammatic view of a corrugating tool constituting a further embodiment of the invention; and FIG. 8 is an enlarged detail of a portion of the tool assembly of FIGS. 3 and 4.

In FIG. 1, there is shown a diagrammatic view of a tube 10 and a gear-like tube-corrugating wheel 12. The tube-corrugating wheel has a plurality of projecting grooving segments or members in the form of teeth 14 circumferentially spaced around its periphery and is mounted for simultaneous rotation about two axes: first, undriven or free rotation about an axis graphically shown as a shaft 16 transverse to, but outward of, the longitudinal axis of the tube 10, as indicated by arrow 17, and second, driven orbiting of the wheel and its shaft around the longitudinal axis of the tube 10, as indicated by arrows 18.

In operation, the tube 10 is continuously moved in the direction of its longitudinal axis as indicated by arrows 20. While the tube advances, the entire corrugating wheel 12 is rotationally orbited about the longitudinal axis of the tube 10, with the advancing inner grooving segments or teeth 14a, 14b, and 14c thus orbiting in spiral paths inward and then again outward in relation to respective successive longitudinal portions of the tube 10. The teeth are spaced so that before each tooth reaches its point of disengagement from the tube, at least one successor tooth has started to form the next groove. As later more fully discussed, the spacing of the teeth (corresponding to the pitch of the annular corrugations formed) is so related to the maximum penetration and the wheel diameter that the angular arc described by a tooth between its point of first contacting the tube and its point of maximum penetration is sufficiently small to produce only a small difference in the longitudinal component of tooth speed between these points.

In the exemplary position shown in FIG. 1, the grooving segment or tooth at 14b is at the angular position orthogonal to the tube and thus completing its annular groove in the region of its maximum penetration into the tube, while the grooving segments or teeth 14a and 14c are respectively at small opposite angles to the position of maximum penetration, the former commencing the successor annular groove and the latter orbiting in the upper portion of the predecessor groove in the course of withdrawal. As the tube 10 is advanced, it rotates the freely mounted corrugating wheel 12 to produce automatically synchronous forward motion of the tube and the corrugating elements by its driving action on the successive teeth.

The method and apparatus of the invention in the broader aspects earlier mentioned may of course be implemented in manners more complex than that illustrated in FIG. 1, but the direct coupling together of the grooving portions of the tool for endlessly repetitive cycling by the forward motion of the tube is obviously advantageous over more complex manners of producing initiation of each groove at a point determined by the position of a predecessor groove. Moreover the employment of a structure wherein the grooving portions of the tool are projections on a wheel or similar circular assembly, in addition to simplicity of construction, has advantages of a more complex nature, particularly when construction parameters are determined in accordance with aspects of the invention now to be discussed.

The motion of a tooth 14 has a forward longitudinal component of speed which is maximum at the point of maximum deformation or penetration of the groove, so that the teeth which are engaged in corrugation grooves do not move forwardly at exactly the same speed. For any selected spacing of the corrugations, corresponding to circumferential spacing of the teeth 14 on the wheel 12, the larger the selected diameter of the wheel 12, the smaller will be the longitudinal speed variation between the engaged teeth. Stated otherwise, the longitudinal speed variation of a tooth as it progresses from the tube-engaging region where it commences its groove through the region of maximum penetration and then through the region of disengagement will be minimized by employment of a large-diameter wheel. It might thus appear that the largest feasible wheel size is desirable. This, however, has been experimentally found to be not the case with most common forms of hollow tubing. The reason for this, as best presently understood, may be best explained by reference to the further schematic or diagrammatic representation of FIG. 7, showing a different form of device incorporating aspects of the invention.

In the embodiment of FIG. 7, rather than being disposed on the periphery of a gear-like wheel, the teeth or working segments 15 are disposed on an endless chain or belt system 13 mounted on sprockets or drums 19 for free circulation around a path having its inner linear portion angularly disposed with respect to the axis of the advancing tube, so that each tooth or grooving portion 15 is linearly progressed in insertion as it advances, with the longitudinal speed of all teeth in working-positions (wherein the chain or belt is backed by rigid structure not shown) being the same, more or less corresponding to the action of a toothed wheel of infinite diameter in the working region. (Orbiting rotational motion of the illustrated tool of FIG. 7 is not shown, but will of course be understood.) To the extent that corrugations are formed solely by inward stretching of the material of the tube at the point of contact of each grooving element, the type of construction shown in FIG. 7 more closely corresponds to ideal action than the relatively small wheel of FIG. 1. However in the corrugation of hollow tubing, such stretching is virtually always accompanied by some degree of shortening of the tube, the rate of tube input (in feet per minute, etc.) commonly being greater than the rate of tube output of the corrugator, whether helical or annular. The magnitude of this input-output speed difference for any given corrugation depth is found to be appreciably greater with materials of high tensile strength, such as steel or even copper, than with relatively soft materials such as pure aluminum, and also varies somewhat with the wall thickness and other variables such as corrugation depth. As may be seen from study, to the extent that the making of a corrugation groove "pulls back" the portion of the tube already corrugated, the simultaneous action of any large number of orbiting working surfaces or segments will produce substantial departure from optimum formation of the output corrugations. This factor is found to cause jamming and complete failure of operation on many tube constructions if it is wholly neglected, as by employment of an excessively large grooving wheel. Thus, although the device schematically illustrated in FIG. 7 embodies the invention in its broader aspects, the utility of such an embodiment is relatively limited as compared with that of a properly designed wheel, in addition to the relative simplicity of construction and durability of the latter.

It will accordingly be seen that the selection of the parameters of a corrugating tool such as that of FIG. 1, and particularly the selection of wheel diameter, etc., for any given corrugation pitch and depth, is far from arbitrary. The minimum permissible diameter is fixed by the requirement that each grooving element has been driven at least partially into the groove it is forming before its predecessor becomes disengaged from the groove it has already formed, in order to produce the continuous recirculating action with drive provided wholly by the tube. It has been found that such a minimum diameter is prone to produce asymmetry of the corrugation shape, apparently ascribable to the post-formation deformation of the trailing side of the corrugation groove which occurs if this side is permitted to serve as the only drive for the wheel, i.e., if the entire force driving the wheel to commence the next groove is imparted by the pushing action of the trailing side of the groove already formed on the grooving element which formed it and is in the region of withdrawal. Accordingly, it is desirable that the wheel diameter be sufficiently large so that each groove has been initiated by the time its predecessor has reached the point of maximum penetration by its grooving element.

The maximum permissible diameter (aside from considerations of bulk and convenience) is fixed by the factor earlier discussed in connection with FIG. 7, i.e., apparent or virtual linear-speed-change of the tube between the point of initiation and the point of maximum deformation of each groove. For a general-utility tool, usable for a wide variety of materials and thicknesses of ordinary tubing, the wheel diameter should be related to the corrugation pitch and depth so that at least one, but not more than one, or at the very most two, successor grooving elements contact the tube when each grooving element is at the point of maximum penetration. Although this construction produces a slightly different corrugation shape than is produced by spiral orbiting of a stationary grooving element of the same shape about a stationary tube, particularly with very deep corrugations, effects on corrugation symmetry and properties of the corrugated product are readily made negligible.

These construction features may also be conveniently expressed in terms of a parameter F, the fractional or percentage penetration of each grooving element into the groove being formed thereby at the time its predecessor is at the point of maximum penetration. It is found that for most materials and thicknesses of hollow tubing best results are obtained with a value of F greater than zero and less than 75 percent, a value of F from 25 to 50 percent being particularly desirable in corrugating hollow tubing of aluminum and copper and similar materials. (As later pointed out, however, somewhat higher values of F are found desirable in corrugation of dielectric-filled tubes.)

The speed of rotational orbiting of the tool assembly must be sufficient, as related to the speed of progression of the tube, to assure completion or substantial roundness of each groove. However in the present invention, it is wholly unnecessary to maintain exactness of the relation between orbiting speed and tube progression speed, mere sufficiency of the former being required. From a theoretical standpoint, it would be desirable to employ an orbiting speed producing many revolutions in the time corresponding to the progression of the tube through a distance corresponding to one groove spacing. From a practical standpoint, however, it is desirable to use the slowest relative orbiting speed which will satisfactorily "finish" each groove, since in commercial application of the invention the rotational or orbiting speed of the corrugating tool assembly or head may be the practical limiting factor in production speed. The most desirable ratio of orbiting speed to tube-advancement speed may be determined experimentally for any particular corrugation task, as later further mentioned.

With the general principles illustrated in FIG. 1 thus described, the further aspects and embodiments of the invention illustrated in the drawing may be readily understood.

In FIG. 2 there is shown diagrammatically, for completeness of illustration, a corrugating machine having a motor drive 24 which supplies power to a tube drive portion 26, illustrative of a conventional type of overall machine construction for continuous production of high-frequency tubing products in which the invention may be employed. The tube drive portion 26 includes caterpillar wheels 32 and 34 mounting a chain-drive 36 carrying spaced tube-clamping units 40 (only a few shown) of the type which automatically clamp the tube as they enter the upper span and release the tube as they reach the forward end of the upper span. The clamping action is of course not sufficiently tight to produce substantial surface irregularities in the thin tube, and is accordingly not sufficiently tight to assure against all slippage. The tube 10 is thus continuously driven by the motor drive but not in fully reliable synchronism therewith. The corrugating portion 28 has a frame 30 with suitable bearing blocks 55 and 56 rotatably supporting a corrugating head 54 which is rotated or orbited around the tube 10 by a power coupling 57 from the motor drive 24.

The construction of the head or corrugating tool assembly 54 is shown in FIGS. 3 and 4. It generally comprises a guide bushing 64 and a tool-mount 66 secured thereto for rotation therewith by bolts 68. A corrugating wheel 69 (corresponding to the wheel 12 of FIG. 1) is mounted for free rotation about a shaft or pintle 70 by a bearing-sleeve 72, the ends of the shaft 70 being secured in the opposite sides of the mount 66. The wheel 69 extends out of the mount 66 through a longitudinal slot 73 in the bushing 64 and thus into the circular cross-section of the longitudinal bushing aperture 74.

The corrugating elements or teeth 75 (corresponding to the elements 14 of FIG. 1) are short lengths of round rod of a material such as carbide steel, mounted in shallow slots or grooves 76 formed in the periphery of the wheel by means such as silver solder 79, as best seen in FIG. 8. The manner of attachment is such that the protruding portion of each circular rod is substantially greater than a semicircle, such shaping having been found advantageous in reducing the working action of the grooving element in the withdrawal portion of the cycle and thus preventing any substantial deformation of the groove after it has passed the point of maximum penetration by the tool.

For most satisfactory corrugation formation, particularly as regards corrugation depth, there is a reasonably tight fit between the bushing aperture 74 and the tube in order to provide at all times a firm backing centering the tube and preventing its deformation from circularity by the groove-forming force exercised by the orbiting tool. In order to prevent marring of the tube as it enters the rotating tight-fitting aperture, the end of the aperture is flared at 77. To eliminate unnecessary friction between the tube and the bushing, the aperture 74 may have a single smallest-diameter portion in the working region and be flared in both directions from that point if so desired.

As seen in FIG. 3, the plane of the center-line of the wheel 69 is slightly displaced from the center of the circular bushing aperture 74, the direction of this displacement being slightly counter-clockwise, which is in the forward direction of rotation as indicated by the arrow 79 in that Figure. The grooving action of the wheel so disposed can be seen from study to be the same as that of a wheel with sufficient thickness added in the clockwise direction to produce visual symmetry, i.e., to have its center plane through the axis of the aperture 74. Stated otherwise, with such a symmetrical arrangement or orientation of the wheel, each of the groove-forming elements has a substantial trailing portion which is found to contribute little or nothing to the grooving action. By eliminating the portion which is not actually utilized in a symmetrical construction, the bulk and weight, as well as cost, of the corrugating wheel is substantially reduced. In addition, it will be observed that this asymmetry lengthens the circular arc of the aperture 74 which confines the tube against transverse motion and deformation from circularity as it is corrugated.

As already indicated, maintenance of synchronism between tube speed and rotational orbiting speed of the tool is not important in the present invention, so long as the speed of orbiting of the tool is sufficient to produce finishing of the grooves, i.e., substantial circularity of the groove root. The orbiting speed is conveniently considered in relation to the tube speed in terms of rotations per groove spacing. The minimum rotation speed required is lower for a large wheel than for a small wheel because of the increased "working time", i.e., the time between initiation and completion of each groove for any given tube speed, of the former. Stated otherwise, the required tool speed is a decreasing function of F, the fraction or percentage earlier defined, for any given corrugation configuration. For the values of F earlier mentioned, the required rotational orbiting speed with respect to tube speed is in the region of approximately twice per corrugation.

In FIGS. 5 and 6 is shown a modified form of corrugating tool permitting slower relative orbiting speed and thus increasing the production-rate potential. Here there are employed diametrically opposed wheels 69a and 69b on shafts or pintles 70a and 70b, each supported in a mount 66a and 66b similar to that previously described. With this construction, the required relative orbiting speed is halved, the parameters of wheel construction being the same as previously described. It will be seen that the offset or asymmetry of the wheel mounting earlier discussed is even more advantageous here than in the single-wheel case as regards the factor by which the residual guide-passage arcs are extended in this manner. Fully satisfactory corrugations are obtained with orbiting speeds substantially less than one rotation per corrugation.

As will be obvious, the required rotational speed may in theory be further reduced by provision of still further wheels on the rotating tool. It has been found, however, that it is in general desirable to employ opposed pairs of wheels, each providing the backing against which the other works the metal, any larger number of wheels occupying too much of the circumference of the guide passage for practical utilization of intervening arcs for confining the circular shape and centered position of the tube. In some instances it may be desirable, particularly where very deep corrugations are wanted, to provide longitudinally spaced corrugating wheels (or pairs of corrugating wheels) on a single tube, producing the ultimate corrugation depth in two stages.

It will be observed that the employment of a plurality of corrugating wheels, whether in the same longitudinal plane or in spaced longitudinal planes, or both, does not require any provision for synchronization of the rotation of the wheels on their respective axes, which is automatically accomplished by the tube motion. As an additional advantage, plural-wheel assemblies may readily be provided with wheels of different diameters (different numbers of teeth) without any substantial complication of construction or mode of operation; such structure reduces the precision required in corrugating-wheel fabrication where, as in manufacture of high-frequency electrical tubing, even relatively small deviations from complete identity of successive corrugations, repeated periodically upon each rotation of a single wheel (or identical wheels), can adversely affect performance characteristics of the finished product.

It has been found that higher values of F (i.e., larger-diameter corrugating wheels) are generally optimum where the tube being corrugated is filled with resilient dielectric, such as in foam-dielectric coaxial cable, than when the same tube is corrugated in the unfilled or hollow condition. Measurements show that where the tube-wall is backed by a foam core into which the corrugations are formed, the input-output length differential is greatly diminished or wholly eliminated. With foam-dielectric coaxial cable, particularly where the tubing is of aluminum, F values of substantially greater than 50 percent may be employed to speed the production rate (with any given number of corrugating wheels) while making the shape of the annular corrugations even more indistinguishable in perfection from those produced by prior art intermittent-motion machinery and methods than in the case of corrugation of the tubing itself. Each grooving portion of the tool in such corrugation may reach maximum penetration in its groove when as much as three or more successive grooves have been initiated.

Many variants of the embodiments illustrated will be readily devised by persons skilled in the art, some of an obvious nature and some of entirely different appearance and detailed mode of operation but nevertheless incorporating the invention. The scope of the protection to be afforded the invention should accordingly not be limited by the embodiments thereof herein illustrated and described, but should extend to all utilization of the teachings of the invention as defined in the annexed claims, and equivalents thereto.

What is claimed is:

1. The method of corrugating thin-wall high-frequency radiation transmission tubing having a foam-dielectric core which comprises successively clamping spaced portions of the tubing, continuously advancing the clamped portions of the tubing in the direction of its longitudinal axis and forming successive spaced annular grooves by inward and forward motion of successive discrete protruding elements on a wheel mounted on a transverse axis while rotating the wheel about the tube, each grooving element being moved forwardly and inwardly against the tube to commence its groove substantially solely in response to the reaching of a point in the forward motion of at least one predecessor grooving element produced by the forward motion of the tube and being thereupon moved forward by engagement in the groove thus initiated to initiate the inward and forward motion of a successor grooving element, whereby corrugation form and spacing are essentially independent of slippage of the clamping, each of said grooving elements reaching in excess of 50 percent of its maximum penetration when its predecessor element is at the point of maximum penetration.

2. In a tool for annular corrugation of tubing comprising a guide having a circular passage adapted to pass a tube to be corrugated, at least one endless series of corrugating members coupled together and mounted on the guide for endless repetitive cycling by the forward motion of the tube through a longitudinal region of penetration into and withdrawal from the passage, said corrugating members being laterally offset from the center of said passage in the direction of the axis of the cycling movement of said members, and means for rotating the guide about the tube, the improvement wherein the cross-section of the passage in the guide at said longitudinal region has arcuate segments adjacent to the corrugating members, of radius no greater than that of any other longitudinal portion of the passage and confining the tube to circular shape and fixed transverse position in said region.

3. The corrugating tool of claim 2 having a plurality of circumferentially spaced laterally offset series of corrugating members having such arcuate segments between each series.

4. In a tool for annular corrugation of tubing comprising a guide having a circular passage adapted to pass a tube to be corrugated, at least one endless series of corrugating members coupled together and mounted on the guide for endless repetitive cycling by the forward motion of the tube through a longitudinal region of penetration into and withdrawal from the passage, said corrugating members having straight inner edges and means for rotating the guide about the tube, the cross-section of the passage in the guide at said longitudinal region having arcuate segments adjacent to the corrugating members, of radius no greater than that of any other longitudinal portion of the passage and confining the tube to circular shape and fixed transverse position in said region.

5. The corrugating tool of claim 2 wherein the portions of the corrugating members which engage the tube are circular in cross-section.

6. In a tool for annular corrugation of tubing comprising a guide having a circular passage adapted to pass a tube to be corrugated, at least one endless series of corrugating members coupled together and mounted on the guide for endless repetitive cycling by the forward motion of the tube through a longitudinal region of penetration into and withdrawal from the passage, and means for rotating the guide about the tube so as to orbit the corrugating members about the tube, the improvement wherein the corrugating members have straight inner edges.

7. The corrugating tool of claim 6 wherein the portions of the corrugating members which engage the tube are circular in cross-section.

* * * * *